United States Patent [19]
Boucher et al.

[11] 3,722,180
[45] Mar. 27, 1973

[54] DE-GASSING OF LIQUIDS

[75] Inventors: Harold T. C. Boucher, Thornbury, near Bristol; Christopher Frank Arthur Wheeler, Whitchurch; John Martin West, Redland, all of England

[73] Assignee: British Aircraft Corporation Limited, London, England

[22] Filed: Apr. 21, 1971

[21] Appl. No.: 136,023

[30] Foreign Application Priority Data

May 1, 1970    Great Britain.....................21,090/70

[52] U.S. Cl. ..........................55/46, 55/199, 261/77, 261/124
[51] Int. Cl. .............................................B01d 19/00
[58] Field of Search......55/44, 46, 53, 194, 196, 199, 55/201; 220/85, 88; 261/364, 77, 124

[56] References Cited

UNITED STATES PATENTS

| 3,590,559 | 7/1971 | Bragg et al.........................261/124 X |
| 2,513,992 | 7/1950 | Burns ..................................55/199 X |
| 2,901,031 | 8/1959 | Powell et al. .........................55/199 X |
| 3,446,488 | 5/1969 | Mail et al............................261/124 X |
| 3,206,032 | 9/1965 | Nottingham et al...............261/124 X |

*Primary Examiner*—Reuben Friedman
*Assistant Examiner*—R. W. Burks
*Attorney*—Sughrue, Rothwell, Mion, Zinn & Macpeak

[57] ABSTRACT

A method of removing gases from a body of liquid, in which the gases have been dissolved at a first ambient pressure, comprising subjecting the liquid to a second ambient pressure of lower absolute value than the first ambient pressure, removing a proportion of the liquid from the body, causing the removed liquid to liberate at least some of the gases dissolved therein in the form of bubbles, and discharging the bubble-containing liquid into the remainder of the body in such a manner that the bubbles pass through the body, thereby releasing at least part of the gases dissolved therein.

5 Claims, 7 Drawing Figures

DE-GASSING OF LIQUIDS

The present invention relates to the de-gassing of liquids, and in particular the de-aeration of fuel within aircraft fuel tanks.

When a liquid fuel (for example aviation kerosene) is exposed to atmosphere, air dissolves in it by up to about 15 percent by volume. The equilibrium ratio of volume of air dissolved to volume of bulk fuel remains constant irrespective of ambient pressure; naturally the mass of dissolved air changes with ambient pressure. Hence, if fuel which has been exposed to atmosphere is loaded into an aircraft tank and taken to altitude (i.e., subjected to reduced pressure) two potential problems exist:

1. the dissolved air may be suddenly released due to a stimulus such as an aircraft vibration or a sudden operation of a fuel pump. At an altitude of say 60,000 ft, the ambient pressure is such that the released air may represent some 210 percent of the fuel volume which, although the tank would be vented to atmosphere, can give rise to a large transient pressure increase within the tank. This may result in tank damage or at least a loss of fuel from the tank due to fuel being forced out by, and/or entrained with, the excess air as it is vented to atmosphere.

2. the dissolved air may be locally released within fuel pumps so that fuel is at least partly prevented from entering the pump impellor. The pump thus fails to function properly.

An object of the present invention is to provide progressive removal of air dissolved within the fuel to preclude the onset of these two problems.

According to the invention a method of removing gases from a body of liquid, in which the gases have been dissolved at a first ambient pressure, comprises subjecting the liquid to a second ambient pressure of lower absolute value than the first ambient pressure, removing a proportion of the liquid from the body, causing the removed liquid to liberate at least some of the gases dissolved therein in the form of bubbles, and discharging the bubble-containing liquid into the remainder of the body in such a manner that the bubbles pass through the body, thereby releasing at least part of the gases dissolved therein.

Preferably the removed liquid is caused to liberate at least some of the gases dissolved therein in the form of bubbles at substantially the same time as that liquid is discharged into the remainder of the body of liquid. Preferably, also, the discharge is continuous over a period of time, throughout which bubbles are formed.

The "proportion" of liquid removed from the body of liquid is not a fixed proportion.

This invention is applicable to all liquids, but preferably the liquid is a fuel and preferably the dissolved gas is air. The equilibrium ratios of the volumes of air dissolved to volumes of bulk fuel vary for different fuels.

According to another aspect of the invention an aircraft fuel system comprises a tank, a vent associated with the tank and connected to atmosphere, at least one pump capable of delivering under pressure any fuel contained in the tank therefrom, and means for returning to the tank a proportion of such fuel that passes through the pump; the return means being such that, when the tank contains fuel and the pump is in operation, the proportion of fuel passing through the return means is caused to liberate at least some of any air dissolved therein in the form of small bubbles and is discharged into the tank fuel.

It is found that, when the tank fuel is under a reduced ambient pressure, the passage of the cloud of small bubbles through the tank fuel acts to progressively release the majority of the air dissolved in the tank fuel. This result is thought to be due to the large surface area presented to the tank fuel by the cloud of small bubbles. Dissolved air is transferred from the tank fuel into the bubbles which, as gaseous pockets, enlarge as they pass through the tank fuel to its surface. Air thus released from the bubbles is then vented to atmosphere.

Considering an aircraft which has been refuelled at ground level, the air dissolved in that fuel is in a stable condition and cannot be removed by circulating fuel through the return means, i.e., the ratio of the mass of air dissolved in the fuel to the mass of fuel has the correct equilibrium value for that ambient pressure (atmospheric pressure at ground level). De-aeration of the tank fuel can only start taking effect by such circulation when the ambient pressure begins to fall, i.e., when the aircraft begins to climb.

When the ambient pressure to which a liquid is subjected changes to a second lower ambient pressure, the process by which any gas dissolved in the liquid transfers to a gaseous state — in order to achieve the particular equilibrium ratio of mass of gas dissolved to mass of liquid relating to that new second ambient pressure — occurs naturally at any interface between the liquid and the gas. In aircraft fuel tanks, the surface area over which this process can naturally occur is insufficient to allow transfer at any useful rate. The present invention, however, enables the tank fuel to be progressively de-aerated, to an extent sufficient to preclude the onset of the two above-mentioned problems, in the time taken by the aircraft to reach its cruise altitude from take-off.

The invention is particularly useful because the air bubbles pass through the tank fuel are derived from air already dissolved in the fuel. Thus, in effect, a proportion of the dissolved air is used to act as an agent for the release of most of the remaining air. The equipment required extra to that already fitted in an aircraft fuel system occupies little space, and there is special advantage in the fact that this extra equipment has no moving parts, and once fitted requires little attention.

One embodiment of the invention is illustrated diagrammatically by way of example in the accompanying drawings. In these drawings.

Figure 1:
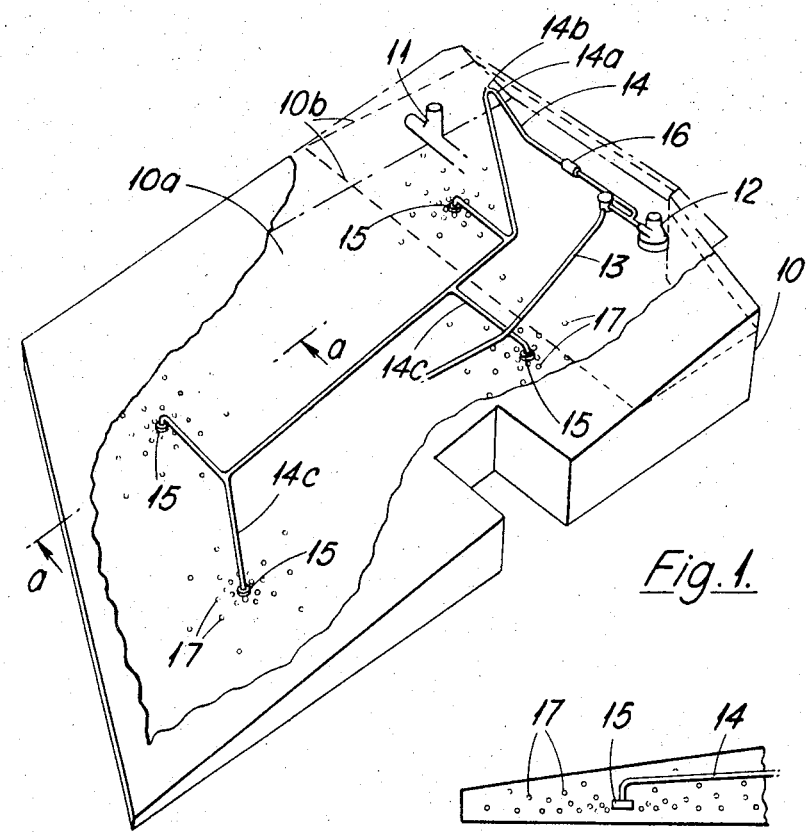
FIG. 1 is a perspective view of part of an aircraft fuel system.
Figure 1A:
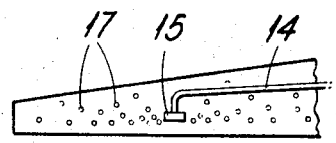
FIG. 1A is a fragmentary section taken along the line $a-a$ of FIG. 1.

Referring initially to FIG. 1, an aircraft fuel tank 10, shown in broken outline, contains liquid fuel 10a. A typical fuel level for a nearly full tank is indicated at 10b. Above the fuel level, in the tank, is an air/fuel vapor mixture which is in communication with the atmosphere through an air vent 11. The air vent 11 is shown as a divorced piece of piping in FIG. 1.

The tank is provided with a submerged type fuel pump 12 which delivers tank fuel along a duct 13 to further fuel tanks (not shown) and/or to aircraft propulsion engines (also not shown).

A duct 14 is connected to the pump delivery duct 13, and terminates in one or more orifice members 15, which are located near the bottom of the tank. As shown, the duct 14 has four branches 14c, each of which terminates in an orifice member 15. The number and disposition of the orifice members 15 are dependent upon the shape and size of the particular fuel tank in which they are installed; this aspect will be discussed in more detail below in the specification.

Figure 2A:
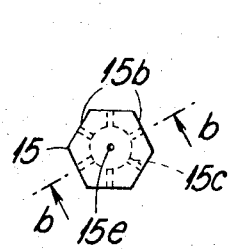
FIGS. 2A and 2B are enlarged detailed views of a component illustrated in FIG. 1, FIG. 2B being a section taken along the line $b-b$ of FIG. 2A; and, FIGS. 3, 4 and 5 are plan view of three aircraft fuel tanks.
Figure 2B:
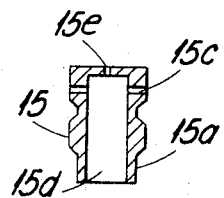

FIGS. 2A and 2B show an orifice member 15. It is in the form of a hexagonally headed bolt, the shank 15a of which is adapted for flow connection with the duct 14. A bore 15d extends through the bolt co-axially with the shank as shown. Each flat portion 15b of the hexagon is formed with a radially directed orifice 15c extending into the bore 15d. An aperture 15e is provided co-axially with the bore 15d through the hexagonal head of the bolt.

Alternative orifice members may be provided. In an example, not shown, the orifice member could comprise a series of small bore tubes extending radially from a blanked-off end of a duct 14.

The duct 14 (FIG. 1) extends upwards in the tank 10 to a point 14a above the fuel level 10b. The point 14a is located between the pump 12 and the orifice members 15 and is provided with a small aperture 14b to break any siphon effect which would otherwise allow tank fuel to flow in reverse along the duct 14 and into the duct 13 during disconnection of the apparatus connected to the duct 13.

Alternatively a non-return valve (not shown) could be positioned in flow connection in the duct 14 between the duct 13 and the orifice members 15. In this case the high point 14a and the aperture 14b are unnecessary.

In either case, filter 16 is included in the duct 14, preferably adjacent to an inspection cover (not shown) in the wall of the tank 10. This filter is included to prevent foreign particles clogging the orifices 15c and aperture 15e.

In operation, the aircraft fuel system described functions as follows. The tank 10 is refuelled with fuel which normally has a proportion of air dissolved in it. The pump 12 is operated either continuously or at intervals, depending on the requirements for fuel transfer or engine consumption during take-off and flight. During pump operation, pressurized fuel is fed initially along the duct 13 and some of this fuel enters the duct 14. This bleed fuel is expelled into the tank fuel through the orifices 15c and apertures 15e. The apertures 15e act primarily, however, as drain holes for any water which may have accumulated in the orifice members 15.

The abrupt changes in velocity of the fuel passing through the orifices 15c cause at least some of the air dissolved therein to be liberated. It is also thought that shear forces in the fuel passing through the orifices help to release the dissolved air, which air passes upwards through the tank fuel in the form of a constant cloud of small bubbles 17. These small bubbles are found to cause a high proportion of the dissolved air in the tank fuel to be released. This released air passes to the fuel surface and is discharged to atmosphere through the vent 11.

The number and disposition of the orifice members 15 are not thought to be critical, provided that a large proportion of tank fuel is stimulated by the bubble clouds. The radially directed orifices cause the bubbles 17 to spray out laterally before rising.

Figure 3:
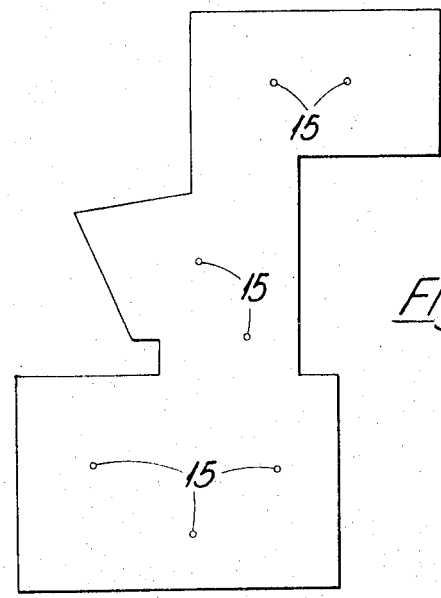
Figure 4:
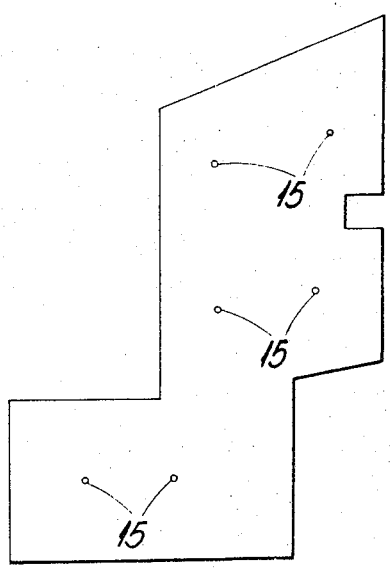
Figure 5:
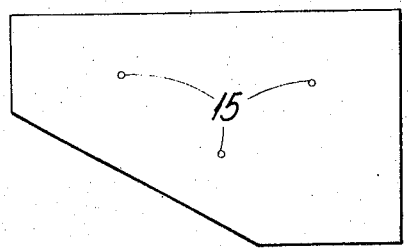

It will be appreciated that aircraft fuel tanks are not necessarily regular in shape and FIGS. 3, 4 and 5 illustrate plan views of three fuel tanks of a delta winged aircraft, showing suitable positions for the orifice members 15. The maximum internal dimensions of the tanks shown in FIGS. 3, 4 and 5 are of the following orders of magnitude:

in FIG. 3, 13.0 m (510 inches);
in FIG. 4, 12.1 m (475 inches); and
in FIG. 5, 8.3 m (325 inches).

A suitable height for the orifice members above the tank floor is of the order of 50 to 75 m/m (2 to 3 inches).

A suitable diameter for the duct 14 is 13 m/m (0.5 inch). Suitable diameters for the orifice 15c and the drain apertures 15e are 1.3 m/m (0.05 inches). For these dimensions the pump 12, in addition to its normal function, should be capable of supplying 2 gallons of fuel per minute for each orifice member 15 at a pressure of approximately 25 pounds per square inch. It has been calculated that the de-aeration process is completed well within the time taken by the aircraft to reach its cruise altitude from take-off i.e., the time taken is in the order of minutes.

In the event of a tank having an installed pump which cannot be used in certain flight conditions, it is envisaged that a separate pump would be provided for deaeration purposes. In a tank having five orifice members 15 a suitable pump would be capable of delivering 10 gallons of fuel per minute at a pressure of approximately 25 pounds per square inch.

The hole 14b, when provided, is preferably of 0.15 m/m diameter (0.06 inches).

We claim:

1. An apparatus for removing gases from liquid fuel in a tank, said gases being dissolved in said fuel at a first ambient pressure, said apparatus comprising:
   a. vent means coupled to said tank for releasing said gases from said tank;
   b. delivery duct means for carrying fuel from said tank;
   c. at least one pump means for pumping said fuel from said tank into said delivery duct means;
   d. return means for returning a portion of said fuel, pumped by said pump means, to said tank wherein said return means comprises means for permitting the liberation of a portion of the gases dissolved in said fuel, said liberated gases being in the form of bubbles, and outlet means in said tank, below the level of said fuel, for dispersing said bubbles into the remaining fuel in said tank, when said fuel is at a second ambient pressure lower than said first ambient pressure, wherein said bubbles will flow to the top of said tank and will liberate said gases dissolved in said remaining fuel in said tank as they flow through said fuel.

2. The apparatus as set forth in claim 1 wherein said outlet means comprises a plurality of orifice means.

3. The apparatus as set forth in claim 2 wherein said orifice means initially directs said bubbles in horizontal planes through said fuel.

4. The apparatus as set forth in claim 1 wherein said gases consist of air.

5. A method of removing gases from a liquid in a tank, said gases having been dissolved in said liquid at a first ambient pressure comprising:

a. lowering said ambient pressure to a second ambient pressure;
b. removing a portion of said liquid from said tank;
c. liberating said gases from said portion of said liquid, said liberated gases being in the form of bubbles in said liquid;
d. passing said bubbles through the remainder of said liquid whereby the passage of said bubbles through said remainder of said liquid causes the liberation of the gases dissolved in said remainder of said liquid.

* * * * *